United States Patent
Leverenz et al.

[11] 3,919,214
[45] Nov. 11, 1975

[54] 1,2,4-BENZOTRIAZINIUM-DYESTUFFS

[75] Inventors: Klaus Leverenz, Leverkusen; Karl-Heinz Schundehutte, Opladen, both of Germany

[73] Assignee: Bayer Aktiengesellschaft, Leverkusen-Bayerwerk, Germany

[22] Filed: Aug. 22, 1973

[21] Appl. No.: 390,374

[30] Foreign Application Priority Data
Aug. 22, 1972 Germany............................ 2241259

[52] U.S. Cl. ............ 260/248 AS; 8/177 R; 8/178 R; 8/179; 260/153
[51] Int. Cl.² ............................. C07D 253/08
[58] Field of Search ................ 260/248 AS

[56] References Cited
UNITED STATES PATENTS
3,349,088  10/1967  Molner et al. .............. 260/248 AS
3,423,409  1/1969   Blattner ..................... 260/248

FOREIGN PATENTS OR APPLICATIONS
1,120,310  7/1968  United Kingdom
76,491     10/1893  Germany

*Primary Examiner*—John M. Ford
*Attorney, Agent, or Firm*—Plumley & Tyner

[57] ABSTRACT

Benzotriazinium dyestuffs of the formula

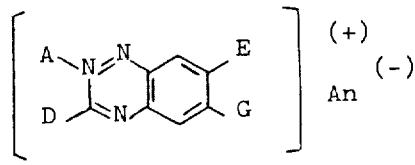

wherein the radicals have the below mentioned meaning, are suitable for dyeing and printing of natural and synthetic materials, particularly of polyacrylnitrile, copolymers of acrylnitrile with other vinyl compounds, of acid modified polyesters and acid modified polyamides.

8 Claims, No Drawings

1,2,4-BENZOTRIAZINIUM-DYESTUFFS

The present invention relates to 1,2,4-benzotriazinium dyestuffs of the general formula

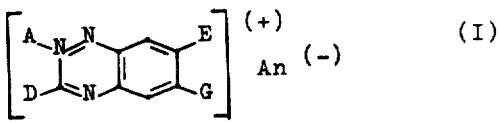

wherein
A denotes an aromatic-carbocyclic or aromatic-heterocyclic radical,
D denotes hydrogen, $NH_2$ or an organic radical,
E denotes hydrogen, alkyl, halogen, alkoxy, aralkoxy or aryloxy,
G denotes an alkoxy radical or a

group
$R_1$ and $R_2$ denote hydrogen or an alkyl, alkenyl, aralkyl or aryl radical, it being possible for $R_1$ conjointly with $R_2$ or E to form a hydrogenated heterocyclic 5-membered or 6-membered ring, and
$An^{(-)}$ denotes an anion as well as processes for their manufacture and their use for dyeing synthetic and natural materials.

Suitable aromatic-carbocyclic radicals A are, in particular, radicals of the benzene and naphthalene series; suitable aromatic-heterocyclic radicals A are particularly heterocyclic radicals which are linked via a fused benzene ring to the triazine ring, for example radicals of the 1,2-methylenedioxybenzene, benzodioxane, benzthiazole, benztriazole, dibenzofurane, carbazole, benzimidazole, indazole or 1,2,3,4-tetrahydroquinoline series.

Suitable organic radicals D are, in particular, alkyl, aryl, alkoxy or aryloxy radicals or 5-membered or 6-membered heterocyclic radicals, for example furane, thiophene or pyridine radicals.

By an alkyl or alkenyl radical, there is understood a straight-chain or branched radical with, preferably, 1 – 6 or 3 – 6 carbon atoms, respectively, which can be substituted by non-ionic radicals, such as the methyl, trifluoromethyl, ethyl, chloroethyl, bromoethyl, cyanoethyl, acetoxyethyl, aminocarbonylethyl, allyl, methallyl or γchloroallyl radical.

Aryl preferably represents phenyl or naphthyl and their derivatives substituted by non-ionic radicals.

Non-ionic substituents in the sense of the present invention are the non-dissociating substituents customary in dyestuff chemistry, such as nitrile, hydroxyl, halogen, nitro, optionally substituted amino, alkyl, phenyl, alkoxy, phenoxy, phenylalkyloxy, acyloxy, alkoxycarbonyl, alkoxycarbonyloxy, alkylmercapto and phenylmercapto, with alkyl preferably containing 1 to 6 C atoms.

Possible anionic radicals An⁻ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of formic acid, acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethylglycollic acid, thioglycollic acid, glyceric acid, malic acid, dodecyl-tetraethylene glycolether-propionic acid, 3-(nonyloxy)-propionic acid, 3-(isotridecyloxy)-propionic acid, 3-(isotridecyloxy)-diethylene glycol-ether-propionic acid, the ether-propionic acid of the alcohol mixture with 6 to 10 carbon atoms, thioacetic acid, 6-benzoylamino-2-chlorocaproic acid, nonylphenoltetraethylene glycol-ether-propionic acid, nonylphenoldiethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4-and 2,4,4-trimethyladipic acid, sebacic acid, isosebacic acid (isomer mixture), tartaric acid, citric acid, glyoxylic acid, dimethyl ether-α, α'-dicarboxylic acid, methylene-bis-thioglycollic acid, dimethylsulphide-α, α-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8$-$C_{15}$ paraffinsulphonic acid, obtained by chlorosulphonation of paraffin oil.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitro-benzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8 -tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 2-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of heterocyclic sulphonic acids is the anion of quinoline-5-sulphonic acid.

Further anions which can be used are those of arylsulphinic, arylphosphonic and arylphosphonous acids, such as benzenesulphinic acid and benzenephosphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents or at least do not influence it adversely are frequently also preferred.

The anion is in general decided by the manufacturing process and by the purification of the crude dyestuff which may be carried out. In general the dyestuffs are in the form of halides (especially chlorides or bromides) or perchlorates, methosulphates, ethosulphates, sulphates, benzenesulphonates or toluenesulphonates, or acetates. The anions can be replaced by other anions in a known manner.

Preferred dyestuffs correspond to the general formula

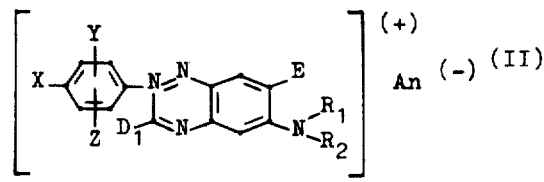

(II)

wherein
E, $R_1$, $R_2$ and $An^{(-)}$ have the meaning indicated in the formula I and
$D_1$ denotes hydrogen, $NH_2$, alkyl, alkoxy, aryl, aryloxy or the radical of a 5-membered or 6-membered heterocyclic structure,
X and Y independently of one another denote hydrogen, halogen, alkyl, alkoxy, alkylmercapto, aralkoxy, aralkylmercapto, aryloxy, arylmercapto, acylamino, dialkylamino, N-alkyl-N-acylamino, arylamino, or N-alkyl-N-arylamino, or conjointly denote a constituent of an optionally hydrogenated carbocyclic or heterocyclic 5-membered or 6-membered ring and
Z denotes hydrogen, halogen, alkyl, alkoxy or alkylmercapto.

Of these dyestuffs, those in which $D_1$ denotes hydrogen are of particular interest.

Particularly preferred dyestuffs are those of the general formula

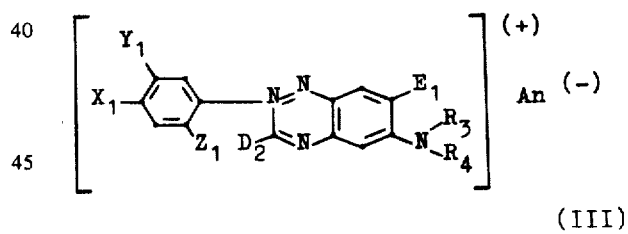

(III)

wherein
$E_1$ denotes hydrogen, methyl, chlorine, bromine, methoxy, ethoxy, benzyloxy or phenoxy,
$D_2$ denotes hydrogen, methyl, phenyl, 2-furyl, 2-thienyl or 2-, 3- or 4-pyridyl,
$R_3$ denotes hydrogen, optionally Cl—, OH— or CN— substituted methyl, ethyl, propyl or butyl; methylcarbonyloxy or ethylcarbonyloxy; benzyl or phenethyl,
$R_4$ denotes optionally Cl—, OH— or CN—substituted methyl, ethyl, propyl or butyl, phenyl, benzyl or phenethyl,
$X_1$ denotes $C_1$ to $C_4$-alkoxy, phenoxy, p-Cl-phenoxy, benzyloxy, acetylamino, benzoylamino, $C_1$ to $C_4$-dialkylamino, N-acetyl-N-methylamino or -ethylamino, $Y_1$ denotes hydrogen, methoxy, ethoxy, acetylamino, methyl or ethyl, $Z_1$ denotes hydrogen, methyl, methoxy or ethoxy and $An^{(-)}$ denotes an anion.

Amongst these dyestuffs, those in which $D_2$ represents hydrogen should in turn be singled out.

Benzotriazinium dyestuffs of the general formula I are new. They can be manufactured in a surprisingly simple manner by cyclisation of azo dyestuffs of the general formula

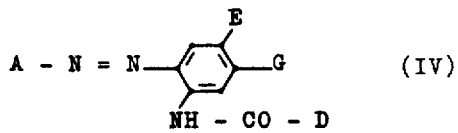

wherein
A, D, E and G have the meaning mentioned in the formula I.

The cyclisation can be carried out in the presence of inorganic or organic acids, acid halides, especially chlorides, or agents which split off acid, which yield the anion $An^{(-)}$, in an aqueous, organic or organic-aqueous medium, preferably in the temperature range of between 0 and 100°C. Acids which can be used are, for example: hydrochloric acid, sulphuric acid, nitric acid, perchloric acid, tetrafluoboric acid, formic acid, acetic acid, chloroacetic acid or propionic acid, methanesulphonic acid, benzenesulphonic acid, toluenesulphonic acid, nitrobenzenesulphonic acid, naphthalenesulphonic acid or mixtures of these acids.

As agents which split off acid it is possible to employ salts of weak bases with strong acids, for example hydrazine sulphate, hydroxylammonium chloride, aniline hydrochloride, toluidine hydrochloride or 1-aminonaphthalene hydrochloride.

As acid halides it is possible to use, for example: thionyl chloride, sulphuryl chloride, phosphorus oxychloride, phosphorus trichloride, phosphorus oxybromide, phosgene, acetyl chloride, acetyl bromide, chloroacetyl chloride, chloroformic acid methyl ester, chloroformic acid ethyl ester, benzoyl chloride, methanesulphonic acid chloride, benzenesulphonic acid chloride or p-toluenesulphochloride.

In the cyclisation reactions in organic-aqueous medium, water-miscible solvents have proved particularly successful, such as alcohols, for example methanol, ethanol, isopropanol, glycol or ethylglycol, or acetonitrile, tetramethylenesulphone or dioxane or mixtures of these solvents. When working with, for example, hydrogen chloride gas, it is also possible to employ solvents which are immiscible with water or of only limited miscibility with water, such as benzene, toluene, chlorobenzene, methylene chloride, chloroform or perchloroethylene.

As a rule, the activity of the strong inorganic acids is superior to that of the weaker organic acids. Hence, favourable results are frequently only achieved with organic acids if the reaction is carried out in organic solvents; in the simplest cases, for example formic acid and acetic acid, the acid can at the same time perform the function of the solvent. If in any particular case the cyclisation with organic acids only takes place incompletely, the reaction can be completed by adding small amounts of inorganic acids. The isolation of the benzotriazinium salts I can then be effected by distilling off the solvent or by precipitating a sparingly soluble salt, for example by adding perchloric acid, tetrafluoboric acid or an aqueous solution of zinc chloride and sodium chloride.

The cyclisation of IV to give I, under the influence of acylating agents, is preferably carried out in organic solvents which are inert towards these acylating agents, such as methylene chloride, chloroform, carbon tetrachloride, acetonitrile, benzene, toluene, chlorobenzene, dichlorobenzene or nitrobenzene. The reactions of IV with acetyl chloride and thionyl chloride take place particularly easily. In these cases, the reaction in most cases takes place even without external warming.

Azo dyestuffs of the formula IV are known in large number and can be manufactured in the usual manner by diazotisation of amines of the general formula $$A - NH_2 \qquad (V)$$

wherein
A has the above meaning and coupling of the resulting diazonium salts with acylamines of the general formula

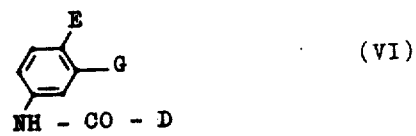

wherein
D, E and G have the above meaning.

A further possibility for the manufacture of the azo dyestuffs of the formula IV is to use, instead of the acylamines VI, coupling components of the general formula

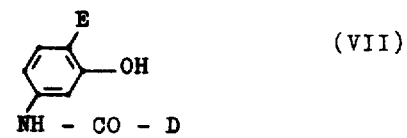

in which
D and E have the meaning mentioned.
The azo dyestuffs which hereupon result, of the general formula

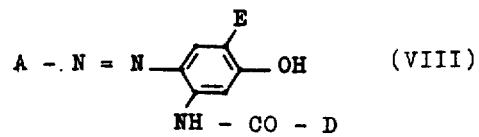

in which
A, E and D have the meaning mentioned
are then converted in a known manner, by means of alkylating agents such as dialkylsulphates, alkyl halides or p-toluenesulphonic acid esters into dyestuffs of the formula IV
in which
G represents an alkoxy group.

Examples of amines V which are used are: 1-aminobenzene, 1-amino-3-methyl-benzene, 1-amino-4-methyl-benzene, 1-amino-3-chlorobenzene, 3-aminobenzotrifluoride, 3-nitro-aniline, 3-aminobenzoic acid ethyl ester, (3-amino-phenyl)-methyl-sulphone, 3-aminobenzenesulphonic acid N,N-dimethylamide, 3-aminobenzenesulphonic acid phenyl ester, 1-amino-3-methoxy-benzene, 1-amino-4-ethoxy-benzene, 1-amino-4-butoxy-benzene, 1-amino-4-benzyloxy-benzene, 4-amino-diphenyl-ether, 1-amino-3-methyl-4-methoxy-benzene, 1-amino-2,4-dimethoxy-benzene, 1-amino-3,4-dimethoxy-benzene, 1-amino-2,5-diethoxy-benzene, 1-amino-4-chloro-2,5-dimethoxy-benzene, 1-amino-2-methoxy-5-methyl-benzene, 1-amino-3,4-methylenedioxy-benzene, 6-amino-benzodioxane-(1,3), 1-amino-4-acetylamino-benzene, 1-amino-4-methoxy-carbonylamino-benzene, 4-aminophenylurea, 4-amino-phenyl-thiourea, 1-amino-4-hydroxy-ethoxybenzene, 4-amino-phenoxy-acetic acid ethyl ester, 1-amino-4-(N-ethyl-N-acetylamino)-benzene, 1-amino-4-(N-benzyl-N-acetylamino)-benzene, 1-amino-4-(phenoxy-acetylamino)benzene, 1-amino-4-methoxy-3-benzoylamino-benzene, 1-amino-3-ethoxy-4-acetylamino-benzene, 1-amino-2-methoxy-4-acetylamino-benzene, 1-amino-2-ethoxy-5-propionylamino-benzene, 1-amino-2-benzyloxy-5-methylsulphonylamino-benzene, 1-amino-4-dimethylamino-benzene, 4-amino-diphenylamine, 4-amino-4'-ethoxy-diphenylamine, 3-amino-N-ethyl-carbazole, 2-methyl-6-amino-benzthiazole, 5-amino-benztriazole, 3-amino-dibenzofurane, 2-methoxy-3-amino-dibenzofurane, 2-methyl-5-amino-benzimidazole, 5-amino-indazole, 6-amino-3-methyl-indazole, 1-benzyl-6-amino-1,2,3,4-tetrahydroquinoline, 1-amino-naphthalene, 1-amino-2-ethoxy-naphthalene, 2-amino-6-methoxy-naphthalene, 1-amino-5-ethoxy-naphthalene, 1-amino-4-acetylamino-naphthalene, 2-amino-6-acetylamino-naphthalene, 4,4'-diamino-diphenylmethane, 2,2-bis-(4-aminophenyl)propane, 4,4'-diamino-diphenyl-ether, 4,4'-diaminodiphenylsulphide, 4-amino-3-methoxy-diphenylamine, (3-amino-4-methoxy-phenyl)-ethyl-sulphone, (2-methoxy-5-aminophenyl)-benzyl-sulphone, 1-amino-4-acetylamino-2,5-dimethoxy-benzene, 1-amino-4-benzoylamino-2,5-diethoxy-benzene, 4,4'-diamino-3,3'-dimethoxy-diphenyl, 2-methoxy-5-aminobenzoic acid ethyl ester, 4,3'-dimethoxy-4'-aminoazobenzene, 2,4,2'-trimethoxy-4'-amino-azobenzene and 4-diethylamino-2-ethoxy-2',5'-dimethoxy-4'-amino-azobenzene.

As examples of coupling components of the general formula VIII there may be mentioned: 1-(N,N-dimethylamino)3-formylamino-benzene, 1-(N,N-diethylamino)-3-formylaminobenzene, 1-(N,N-dibutylamino)-3-formylamino-benzene, 1-(N-ethyl-N-benzylamino)-3-formylamino-benzene, 1-(N-ethyl-N-phenyl)-3-formylamino-benzene, 3-formylamino-diphenylamine, 1-(N,N-diethylamino)-2-methoxy-5-formylamino-benzene, 1-(N,N-diethylamino)-2-acetylamino-benzene, 1-(N,N-diethylamino)-2-ethoxy-5-acetylamino-benzene, 1-(N,N-diemthylamino)-2-phenoxy-5-formylamino-benzene, 1-(N,N-diethylamino)2-ethoxy-5-propionylamino-benzene, 3-formylamino-4'-ethoxydiphenylamine, 1-(N-β-cyanoethylamino)-2-methyl-5-formylamino-benzene, 1-(N-β-cyanoethylamino)-2-chloro-5-formylamino-benzene, 1-(N-benzylamino)-3-formylamino-benzene, 1-(N-ethyl-N-phenethylamino)-3-formylamino-benzene, 1-(N,N-dipropylamino)-2-ethoxy-5-benzoylamino-benzene, 1-(N-benzylamino)-2-benzyloxy-5-formylamino-benzene, 1-[N,N-bis-(β-methoxyethyl)-amino]-3-chloroacetylamino-benzene, 1-[N-ethyl-N-(β-cyanoethyl)-amino]-3-formylamino-benzene, 1-(N-ethylamino)-2-methyl-5-formylamino-benzene, 1-(N,N-diethylamino)-3-ethoxy-carbonylamino-benzene, 1-(N,N-dimethylamino)-3-nitrobenzoylamino-benzene, 1-(N-ethylamino)2-ethoxycarbonyl-5-formylamino-benzene, 1-benzyl-7-formylamino-1,2,3,4-tetrahydroquinoline, 1,2,3,3-tetramethyl-6-formylamino-2,3-dihydroindole, N-(3-formylamino-phenyl)morpholine, 1-methoxy-2-methyl-5-formylamino-benzene, 1,2-diethoxy-5-formylamino-benzene, 1-ethoxy-2-methyl-5-acetylamino-benzene, N-(3-formylamino-phenyl)-pyrrolidine, N-(3-formylamino-phenyl)-piperidine, and 1-methoxy-2,5-diformylamino-benzene.

The dyestuffs obtained according to the process are outstandingly suitable for dyeing and printing fibres of polymers and copolymers of acrylonitrile and dicyanoethylene which can be dyed cationically, and for dyeing and printing acid-modified fibres of polyamide and polyester, whereby fast colour shades are obtained. The dyestuffs can also be used for dyeing and printing tannin-treated cellulose materials, silk and leather. They are furthermore suitable for the manufacture of writing fluids, rubber-stamp materials and ball pen pastes and can also be used in flexographic printing.

Suitable materials for dyeing with the basic dyestuffs of the general formulae I to III are in particular flocks, fibres, filaments, tapes, woven fabrics or knitted fabrics of polyacrylonitrile or of copolymers of acrylonitrile, containing a proportion of at least 85% of acrylonitrile, with other vinyl compounds such as vinyl chloride, vinylidene chloride, vinyl fluoride, vinyl acetate, vinylpyridine, vinylimidazole, vinyl alcohol, acrylic and methacrylic acid esters and amides and asymmetrical dicyanoethylene. Equally, flocks, fibres, filaments, tapes woven fabrics or knitted fabrics of acid-modified synthetic materials especially of acid-modified aromatic polyesters and acid-modified polyamide fibres, can be dyed outstandingly. Acid-modified aromatic polyesters are, for example, polycondensation products of sulphoterephthalic acid and ethylene glycol, that is to say polyethylene glycol terephthalates containing sulphonic acid groups (type DACRON 64 of E. I. DuPont de Nemours and Company), such as are described in Belgian Pat. Specification 549,179 and U.S.A. Pat. Spec. No. 2,893,816.

Dyeing can be carried out from a weakly acid liquor, in which case the material is appropriately introduced into the dyebath at 40° to 60°C and then dyed at the boil. It is also possible to dye under pressure at temperatures above 100°C. Furthermore, the dyestuffs can be added to spinning solutions for the manufacture of fibres containing polyacrylonitrile or be applied to the unstretched fibre.

The dyeings of the dyestuffs according to the invention, of the formulae I to III, on materials of polyacrylonitrile or acid-modified polyester fibres or polyamide fibres are distinguished by very good fastness to light, wet processing, rubbing and sublimation and by a high affinity to the fibre.

The dyestuffs can be used individually or as mixtures. They are very suitable for dyeing shaped articles of polymers or copolymers of acrylonitrile or asymmetrical dicyanoethylene, or of acid-modified aromatic polyesters or acid-modified synthetic high molecular polyamides in chlorinated hydrocarbons as the dyebath, if they carry substituents which assist the solubiliity in chlorinated hydrocarbons, such as, for example, the tert.-butyl group, or if the anion $An^{(-)}$ in the formulae I to III is the anion of a monobasic organic acid with 4–30 car-

Example 1:

16.3 g of the dyestuff of the formula

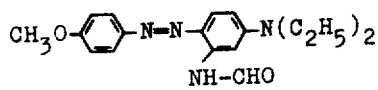
NH—CHO are introduced into 32 g of formic acid and the solution is stirred for one hour at room temperature. After adding 10 ml of 60% strength perchloric acid, a red precipitate separates out, which is filtered off and washed with chloroform. The elementary analysis corresponds to a compound of the empirical formula $C_{18}H_{21}ClN_4O_5$:

|  | C | H | Cl | N | O |
|---|---|---|---|---|---|
| Calculated: | 52.8 | 5.2 | 8.7 | 13.7 | 19.6 |
| Found: | 52.5 | 5.2 | 8.6 | 13.6 | 20.2 |

In contrast to the starting dyestuff, the IR spectrum of the reaction product no longer shows a NH—CO band and the nuclear resonance spectrum is also in good agreement with the following formula of a benzotriazinium dyestuff:

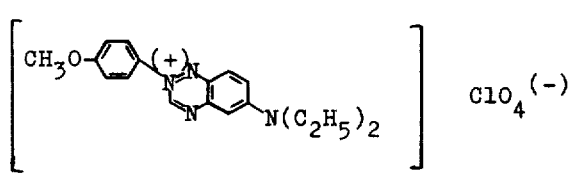

EXAMPLE 2:

5.4 g of the dyestuff of the formula

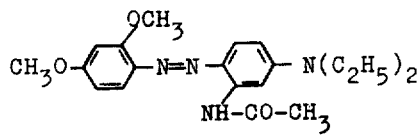

are introduced into a mixture of 100 g of water, 20 g of ice and 60 ml of concentrated hydrochloric acid and after approx. 5 minutes 2 ml of 60% strength perchloric acid are added. The brown precipitate which separates out is filtered off, washed with a little water until neutral and recrystallised from ethanol. The resulting compound probably corresponds to the following formula:

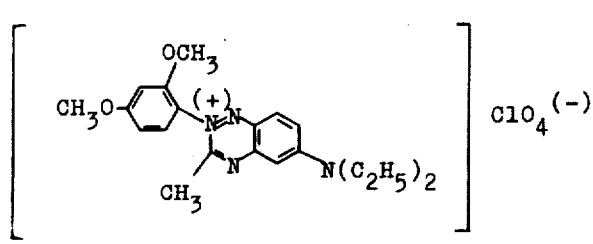

The IR and NMR spectra as well as the elementary analysis are in good agreement therewith. $C_{20}H_{25}ClN_4O_4$:

|  | C | H | Cl | N | O |
|---|---|---|---|---|---|
| Calculated: | 53.0 | 5.5 | 7.8 | 12.4 | 21.2 |
| Found: | 53.3 | 5.75 | 7.65 | 12.1 | 22.0 |

The dyestuff obtained dyes polyacrylonitrile fibres in yellow-brown shades having very good fastness to light.

EXAMPLE 3:

5.1 g of the dyestuff of the formula

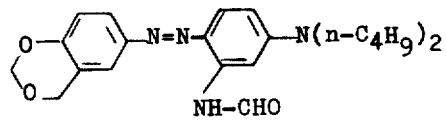

are dissolved in 50 ml of benzene and a mixture of 47 ml of benzene and 3 ml of thionyl chloride is slowly added dropwise over the course of approx. 30 minutes, at 10°–15°C. After a further 30 minutes, the resulting red precipitate is filtered off, washed with benzene and dried. The new compound has the following structure

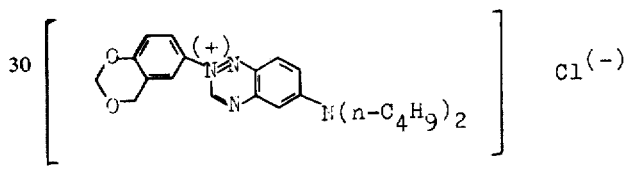

and dyes polyacrylonitrile fibres in clear red shades.

EXAMPLE 4:

5.7 g of the dyestuff of the formula

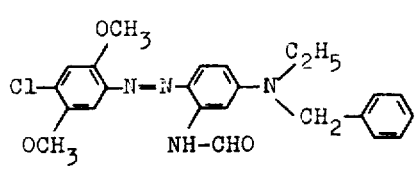

are introduced into 100 ml of glacial acetic acid and the solution is stirred for 12 hours at room temperature. Thereafter the reaction product is precipitated by dropwise addition of a solution of 2.5 g of zinc chloride and 1 g of sodium chloride in 20 ml of water. The brown precipitate is filtered off and washed with 10% strength sodium chloride solution. The dyestuff thus obtained, of the formula

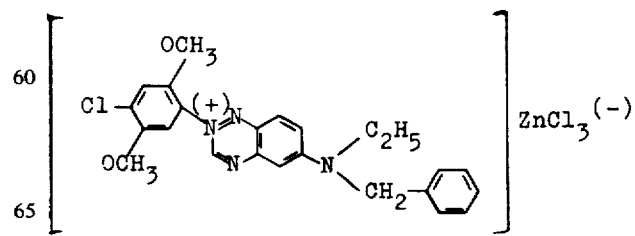

dyes polyacrylonitrile fibres in yellowish-tinged red shades.

EXAMPLE 5:

6 g of the dyestuff of the formula

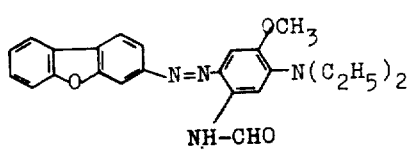

are dissolved in 100 ml of chlorobenzene and a mixture of 3 ml of thionyl chloride and 50 ml of chlorobenzene is added dropwise over the course of 30 minutes whilst stirring, at 10°–15°C. After a further 30 minutes the red precipitate which has separated out is filtered off and washed first with chlorobenzene and then with ether.

The resulting benzotriazinium dyestuff of the formula

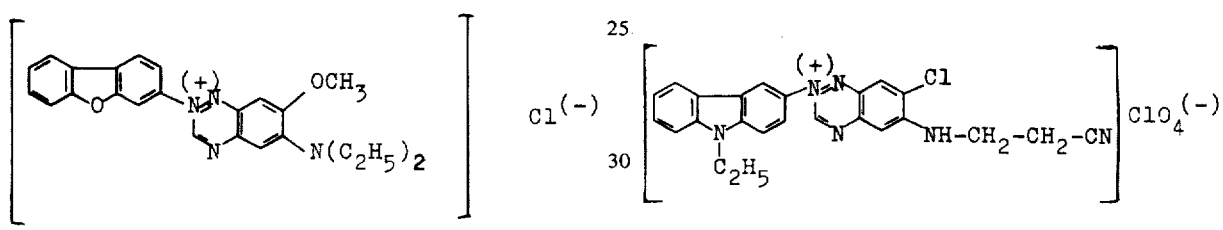

dyes polyacrylonitrile fibres in red shades having very good fastness to light and to decatising.

EXAMPLE 6:

A solution of 3 ml of acetyl chloride in 25 ml of chloroform is added to a solution of 5.3 g of the dyestuff of the formula

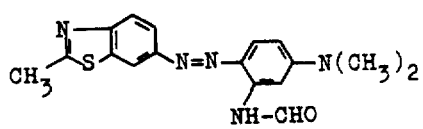

in 100 ml of chloroform over the course of approx. 30 minutes, at 0°–5°C. After 2 hours, the red precipitate is filtered off and rinsed with chloroform. The resulting dyestuff, of the formula dissolves in water to give a red colour and dyes polyacrylonitrile yarn in yellowish-tinged red shades having very good fastness to light and to decatising.

EXAMPLE 7:

6.5 g of the dyestuff of the formula

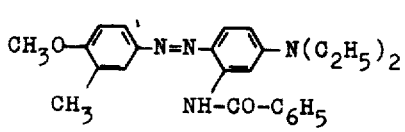

are introduced into a mixture of 75 ml of methanol, 25 ml of water, 25 g of ice and 25 ml of 30% strength hydrochloric acid. After approx. 10 minutes, the dyestuff of the formula which dyes polyacrylonitrile fibres in red shades, is precipitated from the red solution by adding 2 ml of 60% strength perchloric acid.

EXAMPLE 8:

5.8 g of the dyestuff of the formula are dissolved in 100 ml of o-dichlorobenzene and 50 ml of methanol and 3 ml of benzene chloride are added dropwise at room temperature whilst stirring. The brown precipitate which separates out, of the probable structure

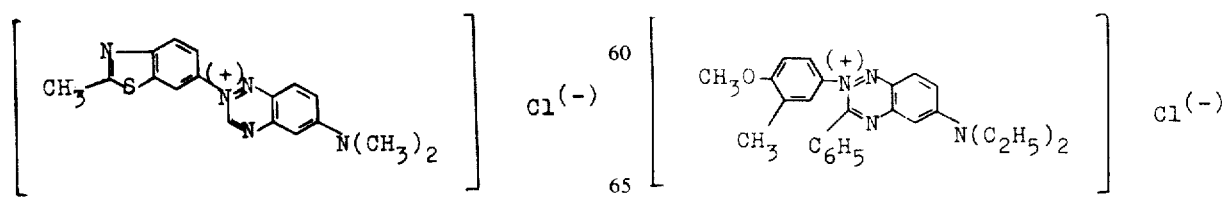

dyes polyacrylonitrile fibres in red-brown shades.

EXAMPLE 9:

A solution of 6 g of the dyestuff of the formula

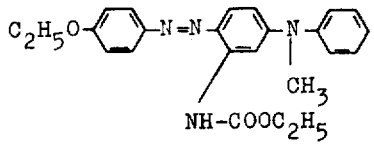

in 100 ml of propionic acid is treated with 5 ml of concentrated hydrochloric acid. On adding 5 ml of 30% strength fluoboric acid to the red solution, a red precipitate of the presumed composition

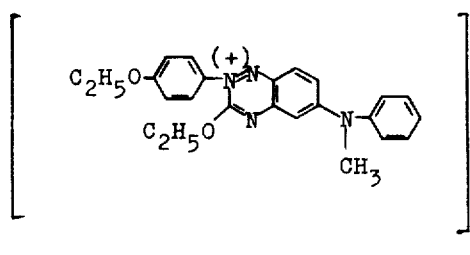

separates out; this dyes polyacrylonitrile fibres, from aqueous solution, in red shades.

EXAMPLE 10:

6 g of the dyestuff of the formula

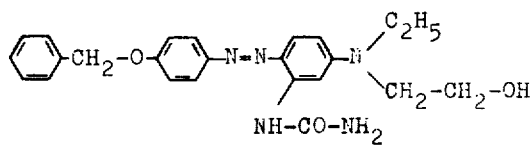

are dissolved in 60 ml of glacial acetic acid. After one hour, the reaction product of the probable structure which dyes polyacrylonitrile in clear orange-coloured shades, is precipitated by adding a solution of 2.5 g of zinc chloride and 1 g of sodium chloride in 50 ml of water.

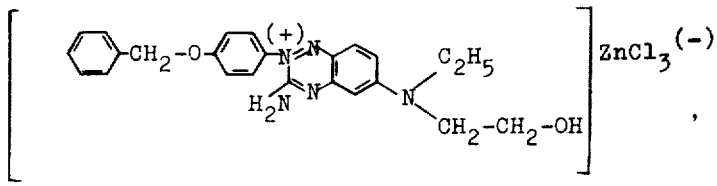

EXAMPLE 11:

6 g of the dyestuff

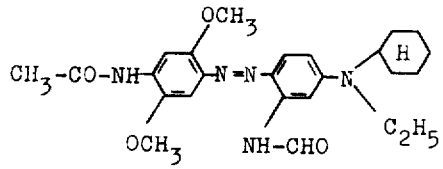

are dissolved in 150 ml of acetonitrile and a solution of 3 ml of chloroacetyl chloride in 50 ml of acetonitrile is slowly added dropwise at 10°C, whilst stirring. The cyclisation is followed by thin layer chromatography. (Silica gel G plates; the flow agent used is the upper phase of a mixture of 8 ml of n-butanol, 2 ml of glacial acetic acid and 10 ml of water). After completion of the reaction, the red precipitate of the formula

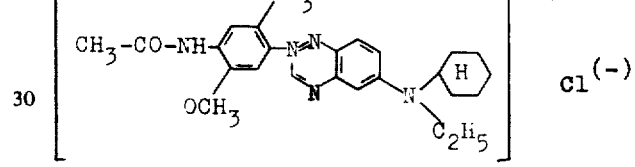

is filtered off. This dyestuff dyes polyacrylonitrile fibres in clear bluish-tinged red shades.

EXAMPLE 12:

10 g of the dyestuff of the formula

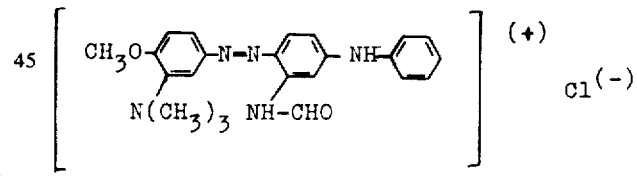

are dissolved in 100 ml of water and 10 g of benzene sulphochloride are added at room temperature. After completion of the cyclisation, the resulting red precipitate is filtered off. The resulting dyestuff salt, having the dication of the formula

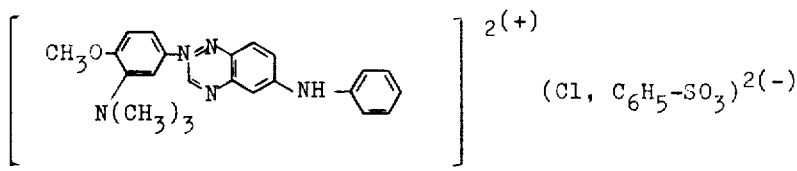

dyes acid-modified polyamide fibres in red shades.

EXAMPLE 13:

6 g of the dyestuff of the formula

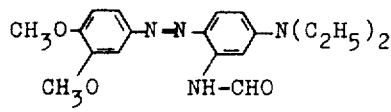

are added to a solution of 20 g of aniline hydrochloride in 75 ml of water and 25 ml of methanol. After stirring for 5 hours at room temperature, the solution is filtered and the dyestuff of the formula

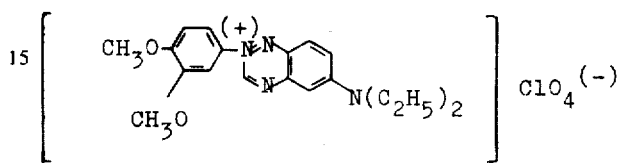

is precipitated by adding a solution of 5 g of sodium perchlorate in 50 ml of water. On polyacrylonitrile fibres, this product yields strong, clear red dyeings of excellent fastness to light. The corresponding trichlorozincate is detained by replacing sodium perchlorate by sodium trichlorozincate.

The table which follows contains benzotriazinium dyestuffs which have been manufactured according to one of the methods described in the preceding examples and which dye polyacrylonitrile fibres in the indicated shades:

| Dyestuff | | Colour shade on polyacrylonitrile |
|---|---|---|
| CH₃-CO-N(C₂H₅)-[aryl(OCH₃)]-N=N-[benzotriazinium]-NH-CH₂-C₆H₅ | Cl$^{(-)}$ | red |
| CH₃O-[aryl]-N=N-[benzotriazinium]-NH-CH₂-CH₂-CN, C₂H₅-CO-NH | ZnCl₃$^{(-)}$ | orange |
| C₆H₅-O-[aryl]-N=N-[benzotriazinium]-N(C₂H₅)₂ | Cl$^{(-)}$ | orange-red |
| [carbazolyl(C₂H₅)]-N=N-[benzotriazinium]-N(CH₃)₂ | ZnCl₃$^{(-)}$ | blue-red |
| C₂H₅O-[aryl(NO₂)]-N=N-[benzotriazinium(COOC₂H₅)]-NH-C₂H₅ | Cl$^{(-)}$ | orange |
| (CH₃)₂N-[benzotriazinium]-N=N-[aryl]-O-[aryl]-N=N-[benzotriazinium]-N(CH₃)₂ | 2(ZnCl₃$^{(-)}$) | orange |

| Dyestuff | | Colour shade on polyacrylonitrile |
|---|---|---|
| 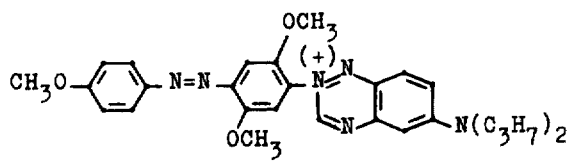 | Cl(−) | brown |
| 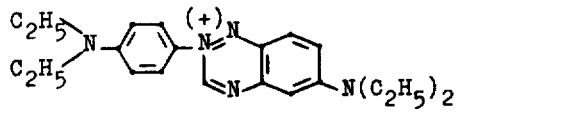 | ClO₄(−) | violet |
| 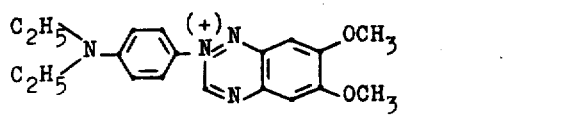 | ClO₄(−) | red |
| 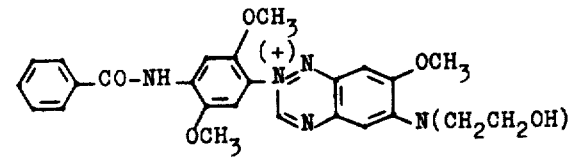 | Cl(−) | blue-red |
| 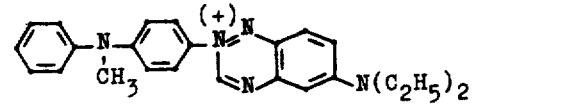 | ZnCl₃(−) | violet |
| 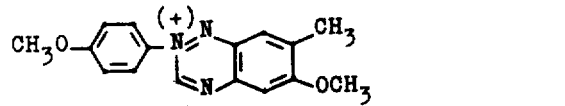 | Cl(−) | yellow |
| 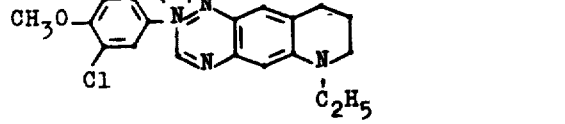 | ClO₄(−) | red-orange |
| 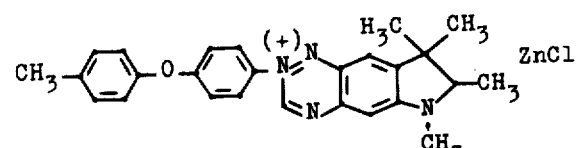 | ZnCl₃(−) | orange |
| 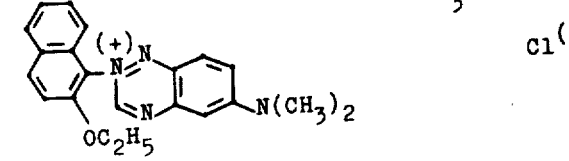 | Cl(−) | orange |
| 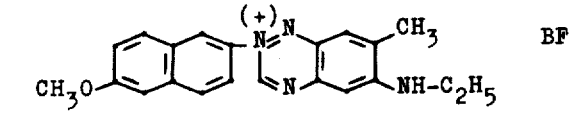 | BF₄(−) | red |
| 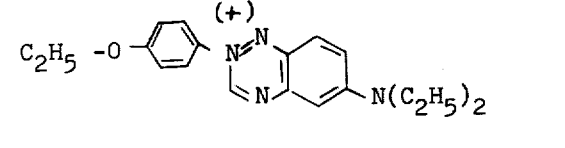 | ZnCl₃(−) | red |

| Dyestuff | Colour shade on polyacrylonitrile |
|---|---|
| 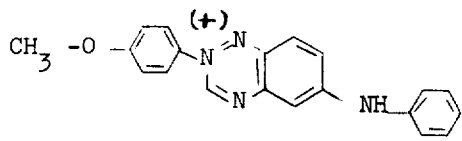  | red |
| 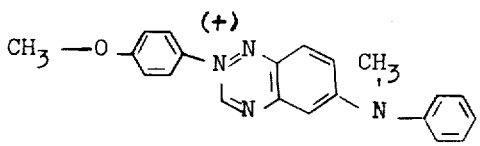 Cl (−) | red |

EXAMPLE 14:

0.5 g of the benzotriazinium dyestuff obtained in Example 1 is dissolved in 3,000 ml of water, with addition of 3 ml of 30% strength acetic acid. 100 g of polyacrylonitrile yarn are introduced into this bath at 40°–50°C, the temperature of the dyebath is raised to 100°C over the course of approx. 40 minutes and dyeing is carried out at this temperature for approx. 1 hour. After rinsing and drying, a strong, clear yellowish-tinged red dyeing of very good fastness properties, especially excellent fastness to light, is obtained.

EXAMPLE 15:

Acid-modified polyglycolterephthalate fibres of the type of DACRON 64 (Du Pont), or as described in Belgian Pat. Specification 549,179 and in U.S.A. Pat. No. 2,893,816, are introduced, using the liquor ratio of 1 : 40, into an aqueous bath at 20°C which contains, per liter, 3 g of sodium sulphate, 0.5 to 2 g of an oleyl polyglycol ether (50 mols of ethylene oxide), 2.5 to 5 g of diphenyl and 0.3 g of the dyestuff of the formula of Example 1, and which has been adjusted with acetic acid to a pH value of 4.5 to 5.5. The bath is heated to 98°C over the course of 30 minutes and kept at this temperature for 60 minutes. Thereafter, the fibres are rinsed and dried. A brilliant yellowish-tinged red dyeing of very good fastness properties is obtained.

EXAMPLE 16:

In a dyeing beaker of 500 ml capacity which is located in a heated waterbath, 0.75 g of the dyestuff of the formula of Example 1 are worked into a paste with a 20-fold amount of hot water, with addition of a little acetic acid, and the paste is dissolved with hot water. Further 0.5 g of the product of the action of 50 mols of ethylene oxide on 1 mol of oleyl alcohol is added to the dyeing liquor, which is made up to 500 ml with cold water. The pH-value of the dyeing liquor is adjusted to 4.5 – 5 with acetic acid or sodium acetate.

10 g of piece goods of acid-modified polyamide are constantly agitated in this dyeing liquor whilst raising the temperature to 100°C over the course of 15 minutes. Dyeing is carried out for 15 to 20 minutes at the boil and the material is rinsed with cold water and subsequently dried, for example by ironing or in a drying cabinet at 60° to 70°C. A material dyed yellowish-tinged red is obtained.

EXAMPLE 17:

A polyacrylonitrile fabric is printed with a printing paste of the following composition:
- 30 parts of the dyestuff of the formula of Example 1,
- 50 parts of thiodiethylene glycol,
- 30 parts of cyclohexanol,
- 30 parts of 30% strength acetic acid,
- 500 parts of crystal gum,
- 30 parts of aqueous zinc nitrate solution ($d = 1.5$) and
- 330 parts of water.

The resulting print is dried, steamed for 30 minutes and subsequently rinsed. A brilliant yellowish-tinged red print having very good fastness properties is obtained.

I claim:

1. Dyestuff of the formula

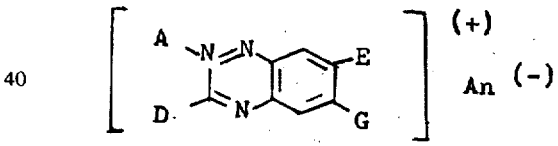

A = benzene, naphthalene, 1,2-methylenedioxybenzene, benzodioxane, benzothiazole, benztriazole, dibenzofurane, carbazole, benzimidazole, indazole, 1,2,3,4-tetrahydroquinoline, N-ethylcarbazole, methylbenzthiazole, methylbenzimidazole, methylindazole, benzyl-1,2,3,4-tetrahydroquinoline, ethoxynaphthalene, methoxynaphthalene, acetylaminonaphthalene, aminodiphenylensulfide, diphenyloxide, or benzene substituted by methyl, chloro, trifluoromethyl, nitro, ethoxycarbonyl, sulphonylmethyl, N,N-dimethylsulphonamide, phenoxysulphonyl, methoxy, ethoxy, butoxy, benzyloxy, phenoxy, acetyamino, methoxycarbonylamino, ureido, thioureido, hydroxyethoxy, ethoxycarbonylmethoxy, N-ethyl-N-acetylamino, benzoylamino, propionylamino, methylsulphonylamino, dimethylamino, phenylamino, ethoxyphenylamino, ethylsulphonyl, benzylsulphonyl, ethoxycarbonyl, dimethylaminobenzotriazolylphenoxy, N-methyl-N-phenylamino, or methylphenoxy;

D = H, $NH_2$, $C_1$-$C_6$-alkyl, phenyl, naphthyl, $C_1$-$C_6$-alkoxy, phenyloxy, naphthyloxy, furyl, thienyl, pyridyl;

E = H, $C_1$-$C_6$-alkyl, phenyl, naphthyl, $C_1$-$C_6$-alkoxy, phenyloxy, naphthyloxy, furyl, thienyl, pyridyl;

E = H, $C_1$-$C_6$-alkyl, halogen, $C_1$-$C_6$-alkoxy, phenyloxy, naphthyloxy, benzyloxy;

G = $C_1$-$C_6$-alkoxy or $R_1$ = hydrogen, $C_1$-$C_4$-alkyl, methylcarbonyloxy, ethylcarbonyloxy, benzyl, phenethyl, or $C_1$-$C_4$-alkyl substituted by chloro, hydroxy, or cyano;

$R_2$ = $C_1$-$C_4$-alkyl, phenyl, benzyl, phenethyl, or $C_1$-$C_4$-alkyl substituted by chloro, hydroxy, or cyano. An (+) = anion.

2. Dyestuff of claim 1 of the formula

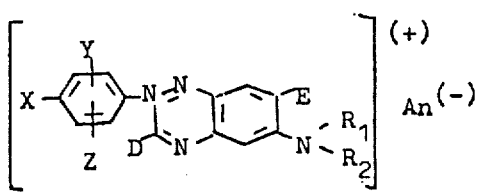

wherein

D, E, $R_1$, $R_2$, and An are defined as set forth in claim 1;

X is $C_1$-$C_4$-alkoxy, phenoxy, p-chlorophenoxy, benzyloxy, acetylamino, benzoylamino, $C_1$-$C_4$-dialkylamino, N-acetyl-N-methylamino, N-acetyl-N-ethylamino;

Y is hydrogen, methoxy, ethoxy, acetylamino, methyl, or ethyl;

X and Y, additionally, when joined together with each other and with the benzene ring are naphthalene, 1,2-methylene dioxybenzene, benzodioxane, benzthiazole, benztriazole, dibenzofurane, carbazole, benzimidazole, indazole, or 1,2,3,4-tetrahydroquinoline; and Z is hydrogen, halogen, $C_1$-$C_6$-alkyl, $C_1$-$C_6$-alkoxy, or $C_1$-$C_6$-alkylmercapto.

3. Benzotriazinium dyestuff of claim 1 of the formula

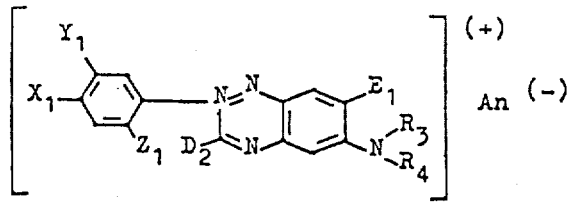

wherein $e_1$ is hydrogen, methyl, chlorine, bromine, methoxy, ethoxy, benzyloxy, or phenoxy;

$D_2$ is hydrogen, methyl, phenyl, 2-furyl, 2-thienyl, 2-pyridyl, 3-pyridyl, or 4-pyridyl;

$R_3$ is hydrogen, $C_1$-$C_4$-alkyl, $C_1$-$C_4$-chloroalkyl, $C_1$-$C_4$-hydroxyalkyl, cyano($C_1$-$C_4$-) alkyl, methylcarbonyloxy, ethylcarbonyloxy, benzyl, or phenethyl;

$R_4$ is $C_1$-$C_4$-alkyl, $C_1$-$C_4$-chloroalkyl, $C_1$-$C_4$-hydroxyalkyl, cyano ($C_1$-$C_4$)alkyl, phenyl, benzyl, or phenethyl;

$X_1$ is $C_1$ to $C_4$-alkoxy, phenoxy, p-chlorophenoxy, benzyloxy, acetylamino, benzoylamino, $C_1$-$C_4$-dialkylamino, N-acetyl-N-methylamino, N-acetyl-N-ethylamino, $Y_1$ is hydrogen, methoxy, ethoxy, acetylamino, methyl, or ethyl;

$Z_1$ is hydrogen, methyl, methoxy, or ethoxy, and $An^{1(+)}$ is an anion.

4. A benzotriazinium dyestuff according to claim 1 of the formula:

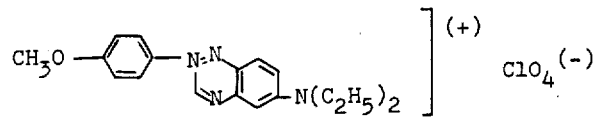

5. A benzotriazinium dyestuff according to claim 1 of the formula:

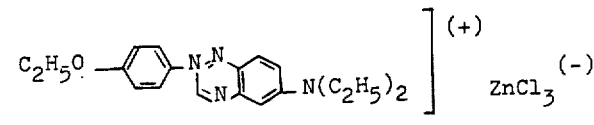

6. A benzotriazinium dyestuff according to claim 1 of the formula:

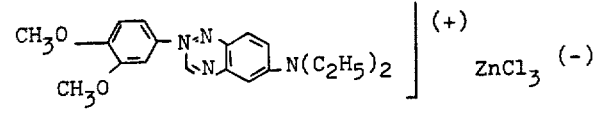

7. A benzotriazinium dyestuff according to claim 1 of the the formula:

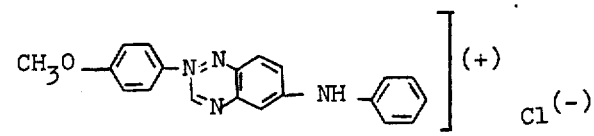

8. A benzotriazinium dyestuff according to claim 1 of the formula:

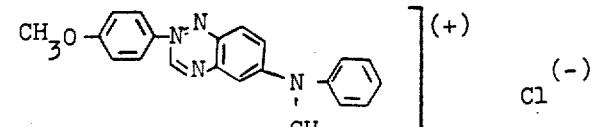

* * * * *